United States Patent
Caja et al.

(10) Patent No.: US 6,326,104 B1
(45) Date of Patent: Dec. 4, 2001

(54) ELECTROLYTES FOR LITHIUM RECHARGEABLE CELLS

(75) Inventors: Josip Caja, Knoxville; Thanthrimudalige D. J. Dunstan, Oak Ridge, both of TN (US)

(73) Assignee: Electrochemical Systems, Inc., Knoxville, TN (US)

(*) Notice: Subject to any disclaimer, the term of this patent is extended or adjusted under 35 U.S.C. 154(b) by 0 days.

(21) Appl. No.: 09/417,593

(22) Filed: Oct. 14, 1999

Related U.S. Application Data

(60) Provisional application No. 60/134,241, filed on May 14, 1999.

(51) Int. Cl.$^7$ .................................................. H01M 6/04
(52) U.S. Cl. ..................... 429/188; 429/303; 429/305; 429/306; 429/321
(58) Field of Search .................................. 429/188, 303, 429/305, 306, 321

(56) References Cited

U.S. PATENT DOCUMENTS

| | | | |
|---|---|---|---|
| 4,310,400 | 1/1982 | Mark, Jr. et al. | 204/195 M |
| 5,552,241 | * 9/1996 | Mamantov et al. | 429/103 |
| 5,589,291 | 12/1996 | Carlin et al. | 429/103 |
| 5,827,602 | 10/1998 | Koch et al. | 429/194 |
| 5,965,054 | 10/1999 | McEwen et al. | 252/62.2 |
| 5,973,913 | 10/1999 | McEwan et al. | 361/523 |

FOREIGN PATENT DOCUMENTS

| | | |
|---|---|---|
| 409139233-A | * 5/1997 | (JP). |
| WO 97/02252 | 1/1997 | (WO). |

OTHER PUBLICATIONS

Koch, et al., The Intrinsic Anodic Stability of Several Anions Comprising Solvent–Free Ionic Liquids, J. Electrochem. Soc., vol. 1 43, No. 3 (Mar. 1996).

Lipsztajn, et al., Electrochemical Reduction of N–(1–Butyl)Pyridinium Cation In 1–Methyl–3–Ethylimidazolium Chloride–Aluminium Chloride Ambient Temperature Ionic Liquids, Electrochemica Acta, vol. 29, No. 10, pp 1349–1352, (1984).

Fannin, Jr., et al., Properties of 1,3–Dialkylimidazolium Chloride–Aluminum Chloride Ionic Liquids. 2. Phase Transitions, Densities, Electrical Conductivities, and Viscosities, J. Phys. Chem, 88, 2614–2621 (1984).

Suarez, et al., The Use Of New Ionic Liquids in Two–Phase Catalytic Hydrogenation Reaction By Rhodium Complexes, Polyhedron, vol. 15, No. 7, pp. 1217–1219 (1996).

Suarez, et al., Enlarged electrochemical window in dialkyl–l–imidazolium cation based room–temperature air and water–stable molten salts, Electrochimica Acta, vol. 42, No. 16, pp. 2533–2535 (1997).

(List continued on next page.)

*Primary Examiner*—Carol Chaney
*Assistant Examiner*—Dah-Wei Yuan
(74) *Attorney, Agent, or Firm*—Kilyk & Bowersoz, P.L.L.C.

(57) ABSTRACT

An electrolyte, such as for a lithium rechargeable cell, is described which contains a pyrazolium cation and may also contain a lithium salt. The lithium salt may be at least one of $LiBF_4$, $LiAsF_6$, $LiPF_6$, and LiTF. The electrolyte, when used in an electrochemical cell, has a charge/discharge capacity and charging efficiency that is superior to the same properties of ionic liquid electrolytes without a pyrazolium cation. Electrochemical cells are also described and contain an anode, a cathode, and the pyrazolium cation electrolyte.

59 Claims, 3 Drawing Sheets

OTHER PUBLICATIONS

Wilkes, et al., Air and Water Stable 1–Ethyl–3–methylimidazolium Based Ionic Liquids, J. Chem. Soc., Chem. Commun., pp. 965–966 (1992).

Gifford, et al., A Substituted Imidazolium Chloroaluminate Molten Salt Possessing an Increased Electrochemical Window, J. Electrochem. Soc., vol. No. 3, pp. 610–614 (Mar. 1987).

Niyazymbetov, et al., Electrochemical Oxidation of Nitroazole Anions, translated from Izvestiya Akademii Nauk SSSR, Seriya Khimicheskaya, No. 10, pp. 2390–2391, published by Plenum Publishing Corp., (Oct., 1987).

Bonhote, et al., Hydrophobic, Highly Conductive Ambient–Temperature Molten Salts, Inorg. Chem. vol., 35, pp. 1168–1178 (1996).

Scordilis–Kelley, et al., Alkali Metal Reduction Potentials Measured in Chloroaliminate Ambient–Temperature Molten Salts, J. Electrochem. Soc., vol. 139, No. 3, pp. 694–699. (Mar. 1992).

Melton, et al., Electrochemical Studies of Sodium Chloride as a Lewis Buffer for Room Temperature Chloroaluminate Molten Salts, J. Electrochem. Soc., vol. 137, pp. 3865–3869. (Dec. 1990).

Fuller, et al. Structure of 1–Ethyl–3–methylimidazolium Hexafluorophosphate: Model for Room Temperature Molten Salts, J. Chem. Soc., Chem. Commun., pp. 299–300. (1994).

Fuller, et al., The Room Temperature Ionic Liquid 1–Ethyl–3–methylimidazolium Tetrafluoroborate: Electrochemical Couples and Physical Properties, J. Electrochem. Soc., vol. 144, No. 11, pp. 3881–3886. (Nov. 1997).

Carlin, et al., Dual Intercalating Molten Electrolyte Batteries, J. Electrochem. Soc., vol. 141, No. 7, pp. L73–L76.(Jul. 1994).

Carlin, et al., Reversible Lithium–Graphite Anodes in Room–Temperature Chloroaluminate Melts, J. Electrochem. Soc., vol. 141, No. 3, pp. L21–L22. (Mar. 1994).

Scordilis–Kelly, et al., Stability and Electrochemistry of Lithium in Room Temperature Chloroaluminate Molten Salts, J. Electrochem. Soc., vol. 141, No. 4, pp. 873–875. (Apr. 1994).

Fuller, et al., In Situ Optical Microscopy Investigations of Lithium and Sodium Film Formation in Buffered Room Temperature Molten Salts, J. Electrochem. Soc., vol. 143, No. 7, pp. L145–L147. (Jul. 1996).

Koch, et al., The Interfacial Stability of Li with Two New Solvent–Free Ionic Liquids: 1,2–Dimethyl–3–propylimidazolium Imide and Methide, J. Electrochem. Soc., vol. 142, No. 7, pp. L116—L118. (Jul. 1995).

Caja, et al., Room Temperature Molten Salts (Ionic Liquids) as Electrolytes in Rechargeable Lithium Batteries, published in SAE Aerospace Power Systems Conference (Apr. 6–8, 1999), Mesa, Arizona, pp. 217–222.

* cited by examiner

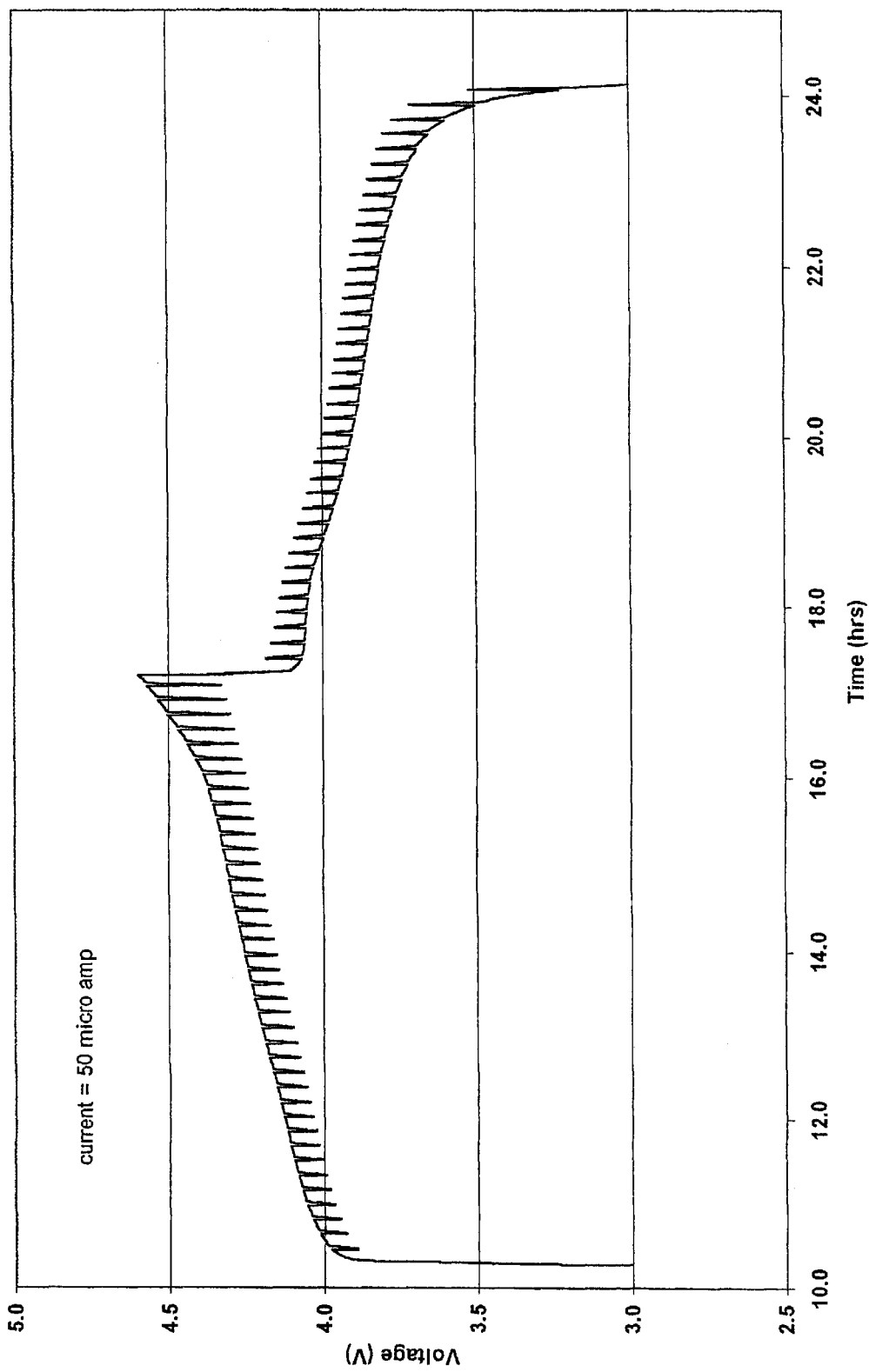

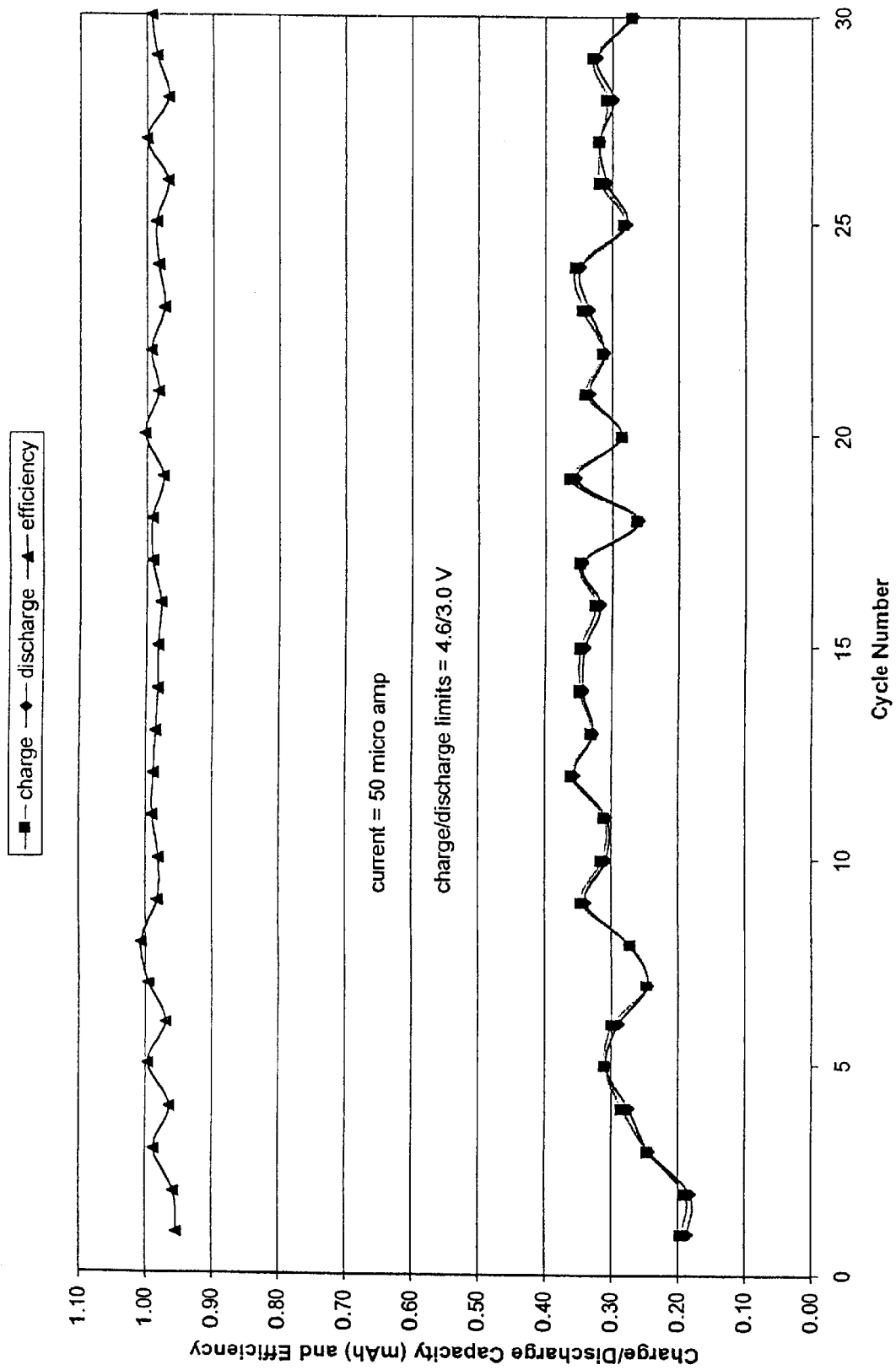
FIGURE 3. Charge/Discharge Capacities and Efficiencies for Test Cell

# ELECTROLYTES FOR LITHIUM RECHARGEABLE CELLS This application claims the benefit under 35 U.S.C. §119(e) of prior U.S. Provisional Application No. 60/134,241 filed May 14, 1999, which is incorporated in its entirety by reference herein.

GOVERNMENT RIGHTS

Part of the work leading to this invention was carried out with the United States Government support provided under the U.S. Air Force Propulsion Directorate phase I SBIR Contract F33615-97-C-2741 and Phase II SBIR Contract F33615-98-C-2808. Therefore, the United States Government has certain rights in and to the present invention.

BACKGROUND OF THE INVENTION

The present invention relates to low temperature molten salt liquid electrolytes. The present invention also relates to electrochemical cells comprising low temperature molten salts.

Low temperature molten salts are a class of salt compositions which are molten at low temperature. Such molten salts are mixtures of compounds (i.e. anions and cations) which are liquid at temperatures below the individual melting points of the component compounds. These mixtures, commonly referred to as "melts," can form molten compositions simultaneously upon contacting the components together or after heating and subsequent cooling.

Low temperature molten salts (ionic liquids) were used as electroplating baths by F. H. Hurley and T. P. Wier, Jr. These low temperature molten salts were obtained by combining aluminum chloride with certain alkylpyridinium halide salts, for example, N-ethylpyridinium bromide.

Some examples of low temperature haloaluminate molten salts are mixtures of aluminum chloride and N-(n-butyl) pyridinium chloride (BupyCl) or 1-ethyl-3-methyl imidazolium chloride (EMIC).

Low temperature molten salts may be used as electrolytes in electrochemical cells, batteries, capacitors, and photoelectrochemical cells. They may also be used in electroplating, electrorefining, catalysis, and synthesis.

One of the useful properties of low temperature (room temperature) haloaluminate melts is their adjustable Lewis acidity. By varying the ratio of aluminum halide to organic halide in melt, changes in solvation characteristics and electrochemical windows can be achieved. Melts that contain an excess of the organic salt are considered basic, due to the presence of halide ions that are not bound to aluminum, while melts that contain an excess of the aluminum halide component are acidic due to the presence of coordinately unsaturated species like $Al_2X_7^-$. Melts containing 50% of each component are neutral melts. The positive potential limit of a basic melt is determined by oxidation of respective halide ions. The negative limit of a basic melt corresponds to the reduction of organic cation (e.g., $Bupy^+$, $EMI^+$). The positive potential limits of acidic melts is due to the oxidation of the haloaluminate species to produce the respective halogen. The negative potential limits of acidic melts is due to the deposition of aluminum. Neutral low temperature melts possess an electrochemical window that corresponds to the positive limit of an acidic melt and the negative limit of a basic melt. In the case of the neutral $AlCl_3$-EMIC melt, the potential window is about 4.4 V.

Room temperature haloaluminate melts are very good solvents because they dissolve a wide variety of organic, inorganic, and organometallic substances. Other properties are good conductivity, negligible vapor pressure at elevated temperatures, a large electrochemical window, and good thermal stability. Therefore, they have also been used in a variety of electrochemical applications including electrodeposition and electroplating.

Impurities like water complicate electrochemical studies. Water reacts rapidly, for example, with aluminum chloride to produce protons and oxide-containing species. The reduction of $Li^+$ was achieved from a solution of $LiAlCl_4$ in neutral $AlCl_3$-EMIC. However, the plating-stripping efficiency was less than 100%, indicating an instability of the deposit.

J. Wilkes and J. M. Zaworotko have prepared the air and water stable low temperature molten salts 1-ethyl-3-methylimidazolium tetrafluoroborate ($EMIBF_4$), and $EMIMeCO_2$. In addition, melts were prepared by others which consisted of $EMI^+$ cation and $PF_6^-$ anion. Besides room temperature melts containing $EMI^+$ cation, melts have also been prepared with different cations, such as the 1,3 dialkylimidazolium cation and the 1,2,3 trialkylimidazolium cation. For example, 1-(n-butyl)-3-methylimidazolium cation utilizing anions such as $BF_4^-$, $PF_6^-$, and $AsF_6^-$ have been prepared. The latter melts show wider electrochemical windows than $EMI^+$ containing melts; however, they also show lower conductivity and lower melting points. In addition, the above melts are not stable toward lithium, a strong reducing agent.

Studies of stability of $EMIBF_4$ have shown that $EMIBF_4$ is not compatible with lithium metal even at room temperature. Within one day the originally colorless melt turns brown and after three days the melt turns into a brownish yellow gelatinous solid. In 1,2-dimethyl-3-propylimidazolium cation, the presence of the methyl group on the second carbon of the imidazolium ring results in a negative shift of reduction potential by 300 to 500 mV compared to the $EMI^+$ cation. Compatibility studies of 1,2-dimethyl-3-propylimidazolium tetrafluoroborate have shown that this melt is more stable towards lithium than $EMIBF_4$ at room temperature, however, at higher temperatures such as 100° C. the melt turns yellow in a few minutes and dark red in a week. When cooled to ambient temperature, the melt forms a very thick liquid which is not substantially flowable. Upon continued heating at 100° C., the melt turns blackish red in two weeks and appears to decompose completely within a month.

Therefore, there is a need for low temperature molten salts that are compatible with lithium metal which can be used as electrolytes in rechargeable lithium or lithium-ion batteries.

SUMMARY OF THE INVENTION

The present invention provides an electrochemical cell and an electrolyte for the cell, wherein the electrolyte is in the form of a pyrazole or pyrazolium cation-containing low temperature molten salt. The electrolyte may preferably be a liquid electrolyte. The electrolyte preferably exhibits an oxidation limit of greater than about 5V vs. lithium, and is thermally stable to at least about 300° C. The electrolyte may preferably include or consist essentially of pyrazolium cations and anions ($X^-$).

The electrolyte of the present invention may have a pyrazolium cation represented by the formulae:

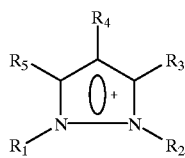

wherein $R_1$ and $R_2$ represent independently an alkyl group comprising 1–12 carbon atoms, and $R_3$, $R_4$, and $R_5$ represent independently H, F, $CF_3$, or an alkyl group comprising from 1 to about 5 carbon atoms. The electrolyte may comprise a binary or ternary molten salt mixture.

The present invention also relates to rechargeable lithium cells which contain the electrolytes of the present invention. The cell includes, in addition to the electrolyte, an anode and a cathode. The anode may be comprised of lithium metal, lithiated carbon, and/or lithium intercalated electrode material. The cathode may comprise $Li_xMn_2O_4$; $Li_xCoO_2$; $Li_xNiO_2$; modified $Li_xMn_2O_4$ electrodes; $Li_xMn_{2-x}Cu_xO_4$, wherein $0.1<x<0.5$; $LiM_{0.02}Mn_{1.98}O_4$ wherein M can be B, Cr, Fe, and Ti; a transition metal oxide; or an electrochemically active conductive polymer.

The foregoing brief description of the invention, and the following detailed description, are illustrative only and not intended to limit the scope of the invention as defined in the appended claims.

BRIEF DESCRIPTION OF THE DRAWINGS

The present invention may be more fully understood with reference to the accompanying drawings which are intended to illustrate, not limit, the invention.

FIG. 2 is a graph showing a charging/discharging curve for an electrochemical cell which includes an electrolyte according to the present invention; and FIG. 3 is a graph showing the charge/discharge capacity and efficiency of a cell which includes an electrolyte according to the present invention.

DETAILED DESCRIPTION OF THE PRESENT INVENTION

Figure 1:
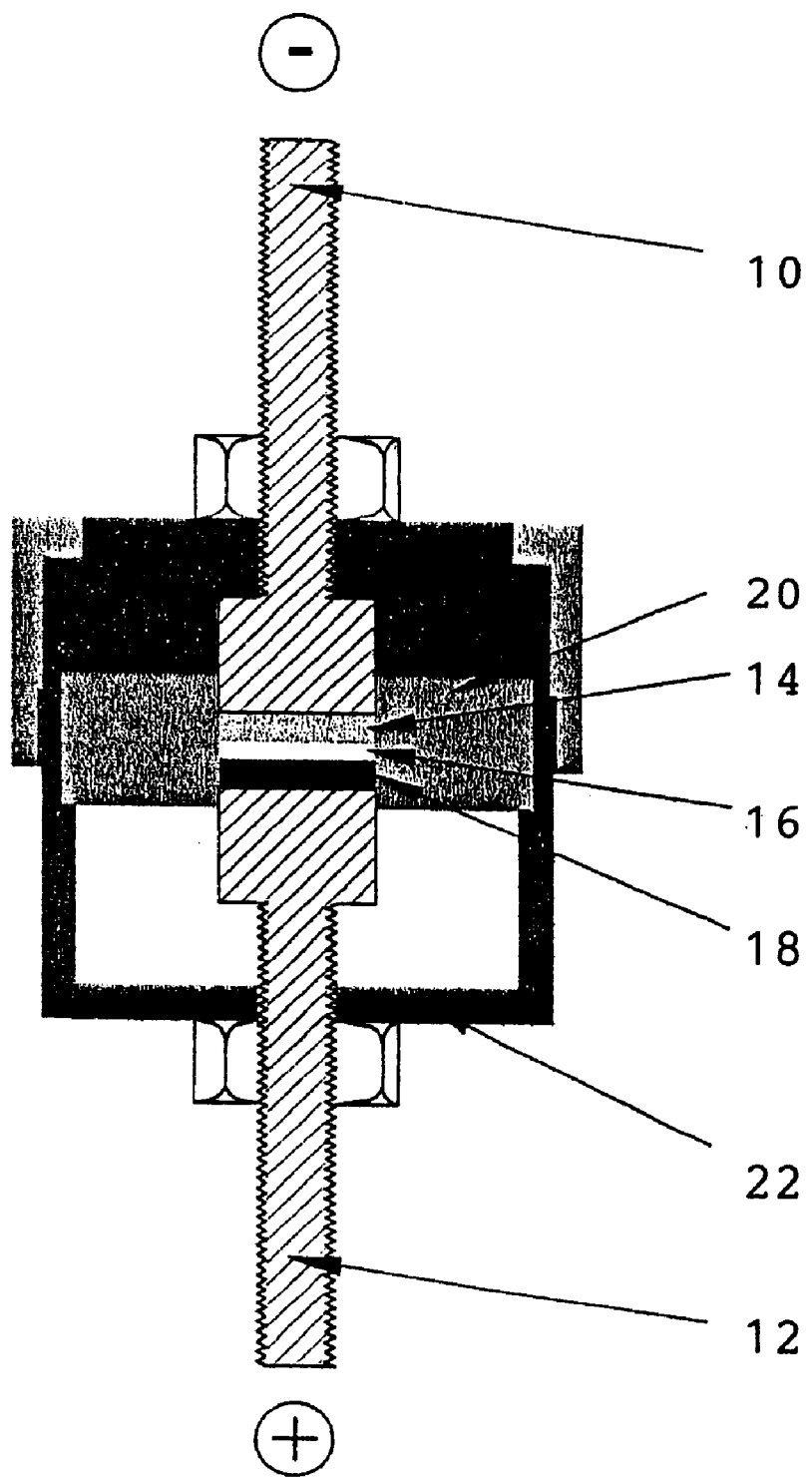
FIG. 1 is a schematic diagram of a test cell which can be used to test the electrolytes of the present invention.

The electrolytes of the present invention include air and water stable ionic liquids preferably having a high stability toward oxidation and a high stability toward lithium. Low temperature melts (ionic liquids) according to the present invention preferably have a wide liquidus range and high thermochemical and electrochemical stability.

The molten salt electrolytes of the present invention comprise at least one pyrazolium cation containing salt. The present invention also relates to an electrochemical cell containing an anode, a cathode, a separator, and a low temperature molten salt according to the present invention. These molten salts of the present invention are useful in applications as electrolytes in batteries, capacitors, electrorefining processes, electrowinning processes, catalysis, various syntheses, and the like.

Low temperature molten salts according to the present invention are preferably molten salts that are liquid below about 80° C. at standard pressure.

According to embodiments of the present invention, the molten salt contains a pyrazolium based cation and a non-Lewis acid counter anion such as $BF_4^-$, $PF_6^-$, $AsF_6^-$, and $CF_3SO_3^-$ (referred to herein as "TF"). Preferred molten salts according to the present invention include those represented by the formula:

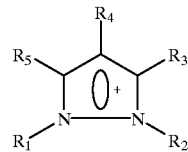

wherein $R_1$ and $R_2$ represent independently an alkyl group comprising 1–12 carbon atoms, and $R_3$, $R_4$, and $R_5$ represent independently H, F, $CF_3$, or an alkyl group comprising from 1 to about 5 carbon atoms. $R_1$ and $R_2$ can be the same or different. $R_3$, $R_4$, and $R_5$ can be the same or different. Preferably, $R_4$ is either hydrogen or fluorine and each of $R_1$ and $R_2$ is a methyl or ethyl group. $X^-$ is a counter anion and is preferably at least one of $BF_4^-$, $PF_6^-$, $AsF_6^-$, or $TF^-$. Preferably, $R_2$ is a methyl group and $R_1$ is either a methyl group or an ethyl group. Particularly preferred formulae include:

(I)

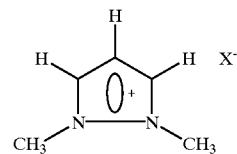

(II)

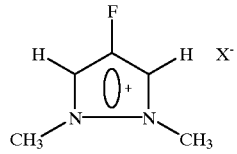

(III)

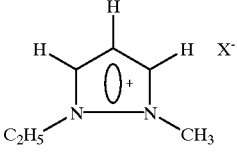

(IV)

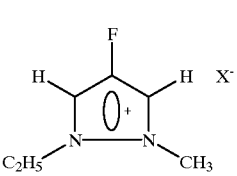

wherein $X^-$ is $BF_4^-$, $PF_6^-$, $AsF_6^-$, or $TF^-$.

The electrolytes of the present invention are preferably non-hydrophobic. In other words, the electrolytes of the present invention are preferably hydrophilic.

According to some embodiments of the invention, the electrolyte comprises a binary molten salt comprising a mixture of single salts, at least one of which contains a pyrazolium cation. If the electrolyte contains a binary system, the binary molten salt mixture preferably contains a second cation which differs from the pyrazolium cation. The second cation may be in the form of a lithium salt, such as $LiBF_4$, $LiAsF_6$, $LiPF_6$, $LiTF$, and the like.

If the electrolyte contains two cations, each can be in the form of a salt, and the anions of the two salts may be the same or different from one another. The pyrazolium cation and the second cation may each be in the form of a salt, and at least one of the two salts preferably comprises $DMPBF_4$, $DMFPBF_4$, $EMPBF_4$, $EMFPBF_4$, EMPTF, or DMFPTF. The other salts may comprise $DMPBF_4$, $DMFPBF_4$, $EMPBF_4$, $EMFPBF_4$, EMPTF or DMFPTF.

According to some embodiments of the present invention, the electrolyte may be a ternary mixture of three different cations. The electrolyte may comprise a mixture of three single salts, at least one of which contains a pyrazolium cation. Preferably, the second cation differs from the pyrazolium cation, and a third cation differs from the pyrazolium cation and the second cation. At least one of the three cations may preferably be a lithium salt such as $LiBF_4$, $LiAsF_6$, $LiPF_6$, LiTF, and the like. The pyrazolium cation, second cation, and/or third cation may be in the form of a salt, and the anions of the three salts may be the same or different. According to an embodiment of the invention, at least one of the anions is different from the other two anions.

According to some embodiments of the present invention, the pyrazolium cation, the second cation, and/or the third cation may be in the form of a salt, and at least one of the three salts comprises $DMPBF_4$, $DMFPBF_4$, $EMPBF_4$, $EMFPBF_4$, EMPTF or DMFPTF. Two of the salts may be selected from $DMPBF_4$, $DMFPBF_4$, $EMPBF_4$, $EMFPBF_4$, EMPTF, or DMFPTF, and another one of the three salts comprises $LiBF_4$, $LiPF_6$, $LiAsF_6$, or LiTF.

The electrolyte may also comprise at least one organic liquid, for example, propylene carbonate, diethyl carbonate, ethyl carbonate, ethyl methyl carbonate, acetonitrile, benzonitrile, dimethyl formamide, sulfolane, tetrahydrofuran, dioxane, dioxolane, methylformate, or combinations thereof.

In some embodiments, the pyrazolium cation is in the form of a pyrazolium salt which is distributed throughout a polymer matrix.

The molten salt electrolytes according to the present invention may contain organic liquids in addition to the pyrazolium cation. If an organic liquid is included in the electrolyte, the organic liquid is reduced and passivates the electrode surface. However, at the same time, the organic liquid preferably decreases viscosity and improves the conductivity of the low temperature molten salt liquid electrolyte. Exemplary organic liquids that may be used include, but are not limited to, propylene carbonate, ethylene carbonate (EC), and diethyl carbonate. Mixtures of such liquids may also be used. For example, the mixture of $EMPBF_4$+0.5 molal $LiAsF_6$+1.1 molal EC showed a conductivity of 5.03 mS/cm at 25° C.

Pyrazole is more stable towards oxidation than imidazole. However, it can still react with $Cl_2$ and $F_2$. Thus, replacing hydrogen on the aromatic ring with an electron withdrawing group, e.g. $NO_2$, $CF_3$, F, and others, will further stabilize the pyrazolitum salts. Thus, by replacing hydrogen on the 1,2-dimethylpyrazolium ring with fluorine, 1,2-dimethyl-4-fluoropyrazolium chloride (DMFPC) is obtained. The DMFPC does not react with $NO_2^+$, and $Cl_2$, but does slowly react with $F_2$ (~50–100 times less reactive than the parent heterocycle). $DMFPC+AlCl_3$ melt reacts very slowly with $SCl_3^+$ which is an extremely strong oxidizing agent.

The liquid electrolytes of the present invention can be used in man), lithium cell applications, for example, in the lithium ion cells described in the publication *Room Temperature Molten Salts (Ionic Liquids) as Electrolytes in Rechargeable Lithium Batteries*, Caja et al., published in the Proceedings of the 1999 SAE L Power Systems Conference, Apr. 6–8, 1999, Mesa, Ariz., pg. 217 et seq, which is herein incorporated in its entirety by reference. The present electrolytes can be used in electrochemical cells and in combination with features of the cells described in the publication. A typical test cell is shown in the attached FIG. 1, taken from the *Room Temperature Molten Salts (Ionic Liquids) as Electrolytes in Rechargeable Lithium Batteries*, publication (Ibid).

As shown in FIG. 1, the typical test cell includes first and second stainless steel threaded rods 10, 12 spaced apart from each other by an anode 14, a separator 16, and a cathode 18. The anode 14, separator 16, and cathode 18 are surrounded by a teflon cylinder 20 and are housed, along with cylinder 20, within a teflon cell assembly 22.

The following examples further illustrate aspects of the present invention but do not limit the present invention.

EXAMPLES

Example I

Synthesis of 1,2-dimethyl-4-fluoropfrazolium tetrafluoroborate ($DMFPBF_4$)

$DMFPBF_4$ was synthesized from N-methylpyrazole by a three step process(1) Direct fluorination of N-methylpyrazole using elemental fluorine to produce 1-methyl-4-fluoropyrazole, (2) Methylation of 1-methyl-4-fluoropyrazole using dimethyl sulfate to form 1,2-dimethyl-4-fluoropyrazolium sulfate, and (3) Anion exchange to produce $DMFPBF_4$.

The first step in the synthesis of 1,2-dimethyl-4-fluoropyrazolium tetrafluoroborate ($DMFPBF_4$) from N-methylpyrazole was the conversion of N-methylpyrazole to 1-methyl-4-fluoropyrazole. The conversion was carried out by passing a steady stream (30 mL/min) of fluorine/nitrogen mixture (15% fluorine by volume) through a well stirred solution of 4.1 g of N-methylpyrazole and 60 mL of trifluoracetic acid at about 0° C. for 19 hours. The resulting yellow solution was neutralized to a pH of about 8 using 30% aqueous ammonia. The aqueous layer was extracted with three, 50 mL portions of methylene chloride. The combined methylene chloride extract was dried for 24 hours over anhydrous sodium sulfate. Evaporation of the methylene chloride produced 2.4 g of a brown liquid. Distillation (between 60° C. to 80° C.) under vacuum produced 1.5 g of colorless liquid. Analysis of this liquid by $^1H$ NMR showed the presence of about 66% 1-methyl-4-fluoropyrazole and 34% of the starting material. In the $^1H$ NMR spectrum, the singlets due to the N-methyl portions on the starting material and the fluorinated product were seen at delta 3.9 and 3.8, respectively. Analysis of the liquid by $^{19}F$ NMR showed the presence of a pseudo triplet at delta –178 (versus external reference $CFCl_3$) due to the fluorine atom on $C_4$. The pseudo triplet was formed by splitting the fluorine signal by slightly different hydrogens on $C_3$ and $C_5$.

The second step in the synthesis of 1,2-dimethyl-4-fluoropyrazolium tetrafluoroborate ($DMFPBF_4$) is the conversion of 1-methyl-4-fluoropyrazole, in the colorless liquid prepared during the first step, to 1,2-dimethyl-4-fluoropyrazolium picrate.

A mixture of 2.0 g of the colorless liquid and 3.0 g of dimethyl sulfate was heated at 75° C. for 16 hours. Next the solution was washed with three 30 mL portions of diethyl either and was dissolved in 20 mL of water. The aqueous layer was extracted with 40 mL of diethyl ether and was added to an aqueous solution (approximately 200 mL) of 1.0 g of sodium hydroxide and 6.6 g of picric acid (contains approximately 15% water by weight). This resulted in the formation of a bright yellow precipitate. After filtration, the precipitate was dissolved in about 80 mL water at 75° C. and the resulting solution was filtered through cotton wool. The filtrate was allowed to cool slowly at ambient temperature when yellow crystals (platelets) of 1,2-dimethyl-4- fluoropyrazolium picrate precipitated out. The solution was filtered under suction, and the precipitate washed with cold water and dried in air at ambient temperature (3.8 g, 87% yield).

The third and the final step in the synthesis of $DMFPBF_4$ is the conversion of 1,2-dimethyl-4-fluoropyrazolium picrate to $DMFPBF_4$.

The picrate (1.5 g; prepared during the second step) was mixed with 2.5 g of $HBF_4$ (48% minimum) in a teflon beaker. The reaction mixture was transferred to a separatory funnel using 10 mL of water and was extracted ten times with 20 mL portions of benzene until both the layers were colorless. Next the colorless aqueous layer was extracted five times with 20 mL portions of diethyl ether until the acidity of the ether layer decreased to about pH 4. The aqueous layer was concentrated in a rotary evaporator to produce a viscous colorless liquid. The viscous liquid in the round bottomed flask was extracted with diethyl ether until the ether layer became neutral, when the liquid crystallized forming a white solid (needles). The solid (810 mg, yield 92%) was dried overnight in a vacuum desiccator.

The melting point was determined to be 54–55.5° C. The 1H NMR spectrum (internal standard TMS) of $DMFPBF_4$ in $DMSO-D_6$ shows a doublet at delta=8.5 due to the two aromatic protons, and a singlet at delta=3.9 due to the six methyl protons (ratio of peak areas=1:3.05). The $^{19}F$ NMR spectrum (external standard $CFCl_3$) shows a peak at delta=−149 due to the four fluorine atoms on the $BF_4^-$ anion and a peak at delta=−173 due to the fluorine atom on the fluoropyrazolium cation. The 11B NMR spectrum (external standard boric acid) shows a peak at delta=−20.6 due to the boron atom in the $BF_4^-$ anion. Elemental analysis of the $DMFPBF_4$ revealed the following results: 29.83% C, 4.28% H, 14.11% N (calculated values are 29.73% C, 3.96% H, 13.88% N). The melting point of $DMFPBF_4$ was found to decrease significantly due to the dissolution of $LiBF_4$ or $LiAsF_6$.

Example II

Synthesis of 1-Ethyl-2-methylpyrazolium Tetrafluoroborate ($EMPBF_4$)

$EMPBF_4$ was synthesized from N-methylpyrazole by a two step process: (1) Ethylation of N-methylpyrazole in toluene, using ethyl iodide and (2) anion exchange of 1-ethyl-2-methylpyrazolium iodide to produce $EMPBF_4$.

The melting point was determined to be 49–50° C. Elemental analysis of the $EMPBF_4$ revealed the following results: 36.40% C, 5.35% H, 14.27% N (calculated values are 36.40% C, 5.56% H, 14.16% N).

Table 1 and Table 2 provide melting points for the low temperature single molten salts and binary and ternary molten salts wherein at least one of the components was a pyrazolium salt.

TABLE 1

MELTING POINTS OF CHARACTERISTIC SINGLE MOLTEN SALTS

| Melt composition | Melting point (° C.) |
|---|---|
| 1,2-dimethylpyrazolium tetrafluoroborate ($DMPBF_4$) | 78–80 |
| 1,2-dimethyl-4-fluoropyrazolium tetrafluoroborate ($DMFPBF_4$) | 54–55.5 |
| 1-ethyl-2-methylpyrazolium tetrafluoroborate ($EMPBF_4$) | 49–50 |
| 1-ethyl-2-methyl-4-fluoropyrazolium tetrafluoroborate ($EMFPBF_4$) | 116–119 |

TABLE 1-continued

MELTING POINTS OF CHARACTERISTIC SINGLE MOLTEN SALTS

| Melt composition | Melting point (° C.) |
|---|---|
| 1-ethyl-2-methylpyrazolium trifluoromethanesulfonate (EMPTF) | 61–62 |
| 1,2-dimethyl-4-fluoropyrazolium trifluoromethanesulfonate (DMFPTF) | 78–79 |

TABLE 2

MELTING POINTS OF BINARY AND TERNARY MOLTEN SALTS

| Melt composition (mole % ratio) | Melting point (° C.) |
|---|---|
| 40/60 $EMPBF_4$ / $DMFPBF_4$ | 15.5–16.0 |
| 40/60 $EMPBF_4$ / $DMFPBF_4$ + 0.85 molal $LiAsF_6$ | −60 (glass transition temperature) |
| $DMFPBF_4$ + 0.8 molal $LiAsF_6$ | −55 to −50 (glass transition temperature) |

The conductivity of the pyrazolium cation containing melts was very good. For example, the conductivity of $EMPBF_4$ at 28° C. (super cooled liquid) was 7.86 mS/cm, and 16.1 mS/cm at 60° C. The conductivity of $EMPBF_4$+0.5 molal $LiAsF_6$ at 25° C. was 2.47 mS/cm and 0.80 mS/cm at 5° C. The conductivity of $DMFPBF_4$ was 8.62 mS/cm at 69° C. The melt 40/60 mole % $EMPBF_4$/$DMFPBF_4$ showed a conductivity of 5.92 mS/cm at 28° C., while 40/60 mole % $EMPBF_4$/$DMFPBF_4$+0.85 molal $LiAsF_6$ showed a conductivity of 1.74 mS/cm at 27° C., 0.28 mS/cm at 0° C., 0.077 mS/cm at −10° C., and 0.02 mS/cm at −20° C. The conductivity of 40/60 mole % $EMPBF_4$/$DMFPBF_4$+0.5 molal $LiAsF_6$ was 2.70 mS/cm at 28° C., 0.337 mS/cm at 0° C., 0.13 mS/cm at −10° C., and 0.034 mS/cm at −20° C.

Examples III–IV

Compatibility of Molten Salt Compositions with Lithium Metal

In order to test the stability of the molten salt electrolyte with an anode, the static compatibility of the molten salt compositions with lithium metal was tested.

Example III

Compatibility of 1,2-Dimethyl4-Fluoropyrazolium Tetrafluoroborate with Lithium Metal About 35 mg of the $DMFPBF_4$ melt and a 3 mg piece of lithium metal with fresh shiny surface were heated in an evacuated sealed tube at 60° C.

After one day at 60° C. the melt appeared clear and colorless, while the lithium metal was shiny. The melting point was determined to be 52° C. to 54° C. After one week at 60° C. the melting point was about 51° C. Next the temperature of the sample was increased to 100° C. After one day at 100° C. the color of the melt was the same, while after 3 days the melt turned very light brown but the lithium metal surface remained shiny. After two weeks at 100° C. the melting point was determined to be about 51° C.

Next, the sample was slowly heated to 170° C. over a one hour period, and was kept at 170° C. for 10 minutes (melting point of lithium 180.5° C.). However, even at this high temperature, no visible change was observed in the sample; the lithium metal remained shiny and the melt remained clear with very light brown coloration (as before). After cooling the sample, the melting point was determined to be about 51° C.

These results clearly show that the molten salt composition was very stable towards lithium metal even at relatively high temperatures. The results suggest that the surface of lithium was passivated (based on cyclic voltammetry results) by reduction products of the melt, preventing any further reactions. Further, these products appear to have only slight solubility in the melt, giving rise to a slight decrease in the melting point.

Example IV
Compatibility of 1-Ethyl-2-Methylpyrazolium Tetrafluoroborate with Lithium Metal Compatibility of the $EMPBF_4$ melt with lithium was investigated at 100° C. Sixty milligrams of the melt and 8 mg of lithium metal were used. The sample was heated to 100° C. until the melt liquefied and formed a clear colorless liquid. After 3 hours at 100° C., the melt was clear and colorless, while the lithium metal remained shiny. After nine hours at 100° C. no change in the sample was observed. When the sample was cooled to ambient temperature, at the end of four days, the melt formed a supercooled liquid which flowed easily. The melt and the lithium metal still appeared the same. After two weeks the melt appeared clear with very light yellow coloration. The surface of the lithium metal was shiny as before. After three weeks at 100° C., the melting point was determined to be 47.5° C. to 49° C. and the melt and the lithium piece appeared the same. After seven months at 100° C. the melt was clear with the same light coloration as before and the surface of the lithium was shiny. The melting point was determined to be 48° C.–49° C.

These results clearly show that unlike $EMIBF_4$ and $DMPIBF_4$, both $DMFPBF_4$ and $EMPBF_4$ were very stable towards the lithium metal over long periods at relatively high temperatures.

The compatibility of the electrode materials $LiMn_2O_4$ and Cabot carbon in $DMFPBF_4$+0.37 molal $LiBF_4$ was investigated. The static compatability of these materials was investigated by measuring Raman spectra of the melt after immersion of these materials in the melt contained in an evacuated sealed tube at 60° C. A control sample was prepared by evacuating and sealing a Pyrex tube containing only the melt. After heating the tubes in an oven at 60° C. for 19 days the Raman spectra of the clear melts above the samples were measured. Comparison of the Raman spectra of the melts containing the samples with that of the control sample showed essentially no change of the spectra due to the presence of electrode materials. In addition, all the melts, including the control sample, were clear and colorless. These results show that the $DMFPBF_4$+0.37 molal $LiBF_4$ melt is compatible with the electrode materials under static conditions.

The molten salt liquid electrolytes of the present invention were thermally stable in a wide temperature range. Thermogravimetric Analysis (TGA) showed that both $EMPBF_4$ and $DMFPBF_4$ were thermally stable at temperatures up to 300° C.

Example V
Oxidation and Reduction Limits

Oxidation and reduction limits for low temperature molten salts were determined by cyclic voltammetry (CV). A glassy carbon electrode was used as a working electrode, a platinum (Pt) wire was used as a counter-electrode, and a piece of lithium (Li) metal attached to Pt-wire immersed into the melt containing $LiBF_4$ placed in a fritted glass tubing was used as a reference electrode.

The cyclic voltamogramms showed an oxidation potential of 5.4 V vs. Li for a $DMFPBF_4$+$LiBF_4$ melt at 70° C. The reduction of the melt started at ~1.3 V vs. Li, achieved a small peak at ~1.0 V vs. Li, and then dropped to the background current.

The oxidation potential of 5.4 V vs. Li was obtained for an $EMPBF_4$+$LiBF_4$ melt at 60° C. However, the reduction started at ~1.0 V vs. Li, achieved a small peak at 0.875 V vs. Li, which then decreased to the background current. The reduction peaks were due to the reduction of the $DMFP^+$ and $EMP^+$ cations. From CV measurements, it appeared that both $EMP^+$ and $DMFP^+$ cations were thermodynamically unstable towards reduction by lithium. Hence the reduction peaks could be explained by the reduction of the cation which was adsorbed and formed a protective, passive layer on the surface of the electrode thus giving rise to kinetic stability of the melts.

CVs obtained for the $DMFPBF_4$, $EMPBF_4$ melts containing lithium salts (for example, $LiBF_4$, $LiAsF_6$) showed deposition and dissolution of lithium. This is expected if the reduction products adsorbed on the electrode surface prevent further reduction of the pyrazolium cation, but is lithium ion-conducting thus allowing deposition and dissolution of lithium.

Examples VI–IX
Electrochemical Cells

Electrochemical cells were constructed using standard methods and made of an $LiMn_2O_4$ cathode, a lithium anode, a separator, and the low temperature molten salt liquid electrolytes of the present invention.

Example VI
The Cell $LiMn_2O_4$/$DMFPBF_4$+0.37 molal $LiBF_4$/Li

The $LiMn_2O_4$ cathode was made by mixing $LiMn_2O_4$ (EM Industries) and carbon with a solution of polyvinylidene fluoride (PVDF- Elf-Atochem) in acetone to form a slurry which was stirred to obtain a homogeneous composition. The slurry was spread on an aluminum foil and dried first in air and next in vacuum at 80–90° C. overnight. The ratio of $LiMn_2O_4$:C:PVDF was 75–82%:8–10%:5–10% by weight. The lithium electrode was made of a piece of lithium ribbon (Alfa Aesar). Celgard 2500 was utilized as the separator.

The diameters of the electrodes were ½ inch each. The cell had a calcualted capacity of 0.59 mAh. The cell was operated at 55° C. The charging/discharging current was 100 $\mu A$. Charging cut off voltage was ~4.45 V, discharging cut off voltage was in the range of 3.0–3,39 V. The assembled cell showed an open circuit voltage (OCV) of 2.86 V. The charged cell showed an OCV of 4.18 V.

In the first cycle the cell was charged to 75% of calculated capacity while capacity efficiency was 44%. However, charging capacity decreased with cycling. For example, after 15 cycles, the charging capacity was 29%. Capacity efficiency during cycling was in the range of 42% to 68%. The cell was charged/discharged for 30 cycles.

Example VII
The Cell $LiMn2O_4$/40/60 mole % $EMPBF_4$/$DMFPBF_4$+ 0.49 molal $LiAsF_6$/Li This cell was built and tested. The $LiMn_2O_4$ electrode bad the following composition: 85% $LiMn_2O_4$, 5% carbon, and 10% PVDF, and aluminum foil which served as the current collector, The lithium electrode was made as mentioned in the last mentioned example. The separator and electrode preparations were identical to those for the last mentioned cell. The calculated capacity of the cell was 0.99 mAh.

The cell was charged/discharged for more than 45 cycles at room temperature. Charging/discharging cut off voltage limits were set up at 4.6 V, and 3.0 V, respectively. The assembled cell (discharged state) showed an OCV of 3.4 V while the charged cell showed an OCV of 4.2 V. The OCV of the charged cell was stable for more than a day.

Table 3 below shows the charge/discharge capacity and capacity efficiency vs. cycle number for the cell.

TABLE 3

Charge/discharge capacity and capacity efficiency vs. cycle number for the cell $LiMn_2O_4$ / 40/60 mole % of $EMPBF_4$ / $DMFPBF_4$ + 0.49 molal $LiAsF_6$ / Li

| Cycle # | Charge capacity [mAh] | Discharge capacity [mAh] | Capacity efficiency $[mAh]_{dc}$ / $[mAh]_{ch}$ × 100 |
|---|---|---|---|
| 1 | 0.386 | 0.286 | 74 |
| 2 | 0.279 | 0.262 | 94 |
| 3 | 0.255 | 0.247 | 97 |
| 4 | 0.219 | 0.210 | 96 |
| 5 | 0.203 | 0.201 | 99 |
| 10 | 0.247 | 0.232 | 94 |
| 20 | 0.241 | 0.222 | 92 |
| 25 | 0.223 | 0.205 | 92 |
| 30 | 0.189 | 0.175 | 93 |

At the beginning, charge capacity was approximately 30% of calculated capacity. After cycle #30 it was 19%. Charging/discharging efficiency was very high (>90%) throughout cycling.

Example VIII

Cell $LiMn_2O_4$/$DMFPBF_4$+0.8 molal $LiAsF_6$/Li

Cell construction and electrode composition was identical to the previous cell. cell had a calculated capacity of 0.73 mAh and was cycled at room temperature for more than 30 cycles. Charging/discharging cut-off voltage limits were set up at 4.6 V, 3.0 V, respectively. The cell was charged/discharged at I=20 μA. The assembled cell showed an OCV of 3.4 V while the charged cell showed an OCV of 4.2 V.

Table 4 below shows the charge/discharge capacity and capacity efficiency vs. cycle number for the cell.

TABLE 4

Charge/discharge capacity and capacity efficiency vs. cycle number for the cell $LiMn_2O_4$ / $DMFPBF_4$ + 0.8 molal $LiAsF_6$ / Li

| Cycle # | Charge capacity [mAh] | Discharge capacity [mAh] | Capacity efficiency $[mAh]_{dc}$ / $[mAh]_{ch}$ × 100 |
|---|---|---|---|
| 1 | 0.196 | 0.175 | 89 |
| 2 | 0.218 | 0.200 | 92 |
| 3 | 0.191 | 0.190 | 100 |
| 4 | 0.173 | 0.168 | 97 |
| 13 | 0.196 | 0.195 | 100 |
| 15 | 0.176 | 0.173 | 98 |
| 20 | 0.168 | 0.168 | 100 |
| 28 | 0.164 | 0.157 | 98 |

After the first two cycles, this cell showed almost 100% capacity efficiency. However, charging capacity slowly decreased (from 30%) with cycling achieving about 23% of the calculated capacity at cycle #28.

Example IX

Cell $LiMn_2O_4$/$EMPBF_4$+0.8 molal $LiAsF_6$/Li

Cell construction and electrode composition were identical to the cell in Example VIII. The cell had a calculated capacity of 0.58 mAh and was cycled at room temperature for 30 cycles. Charging/discharging cut off voltage limits were set up at 4.6 V, and 3.0 V, respectively. The cell was charged/discharged at I=50 μA. Table 5 below shows the charge/discharge capacity and capacity efficiency vs. cycle number for the cell.

TABLE 5

Charge/discharge capacity and capacity efficiency vs. cycle number for the cell $LiMn_2O_4$ / $EMPBF_4$ + 0.8 molal $LiAsF_6$ / Li

| Cycle # | Charge capacity [mAh] | Discharge capacity [mAh] | Capacity efficiency $[mAh]_{dc}$ / $[mAh]_{ch}$ × 100 |
|---|---|---|---|
| 1 | 0.196 | 0.187 | 95 |
| 2 | 0.190 | 0.182 | 96 |
| 3 | 0.246 | 0.243 | 99 |
| 4 | 0.285 | 0.275 | 96 |
| 5 | 0.310 | 0.309 | 100 |
| 10 | 0.315 | 0.309 | 98 |
| 15 | 0.347 | 0.341 | 98 |
| 21 | 0.340 | 0.334 | 98 |
| 24 | 0.354 | 0.348 | 98 |
| 29 | 0.329 | 0.324 | 98 |

From Table 5 it is observed that charging capacity in the cycle #1 is 34% of the theoretical capacity which increases with cycling to 61% in the cycle #24. Charging/discharging efficiency was very high (>95%) throughout cycling.

FIG. 2 shows a typical charging/discharging curve for the cell at room temperature. FIG. 3 shows the charge/discharge capacity and efficiency versus the cycle number for the cell. From FIG. 3 it is evident that this cell was cycled at almost 100% efficiency. As can be seen from FIG. 3, the charge and discharge values essentially overlap point by point for each cycle number. Charging capacity of the cell slowly decreased with cycling.

The results of the foregoing examples indicated that the pyrazolium electrolytes tested can be useful as electrolytes in lithium cells. Further improvements in cell capacity can be accomplished by utilizing additives in the electrolytes as well as by optimizing the cell components, for example, using specific electrodes and specific types of lithium salts.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. An electrochemical cell comprising an electrolyte, said electrolyte comprising a non-hydrophobic pyrazolium cation-containing molten salt and at least one non-Lewis acid counter ion, wherein said counter ion comprises $BF_4^-$, $PF_6^-$, $AsF_6^-$, or $CF_3SO_3^-$, or a mixture thereof.

2. The electrochemical cell of claim 1, wherein said electrolyte comprises a single salt consisting essentially of pyrazolium cations and anions (X).

3. The electrochemical cell of claim 3, wherein said electrolyte comprises a binary molten salt mixture comprising a mixture of single salts, at least one of which contains a pyrazolium cation.

4. The electrochemical cell of claim 4, wherein said binary molten salt mixture comprises a second cation which differs from said pyrazolium cation.

5. The electrochemical cell of claim 4, wherein said second cation is in the form of a lithium salt selected from $LiBF_4$, $LiAsF_6$, $LiPF_6$, and LiTF.

6. The electrochemical cell of claim 4, wherein said pyrazolium cation and said second cation are each in the form of a salt and the two salts are different.

7. The electrochemical cell of claim 3, wherein said molten salt mixture comprises two different salts, each containing the same pyrazolium cation.

8. The electrochemical cell of claim 4, wherein said pyrazolium cation and said second cation are both in the form of a salt and at least one of the two salts comprises $DMPBF_4$, $DMFPBF_4$, $EMPBF_4$, $EMFPBF_4$, EMPTF, or DMPTF.

9. The electrochemical cell of claim 4, wherein said pyrazolium cation and said second cation are both in the form of a salt and each of the salts comprises $DMPBF_4$, $DMFPBF_4$, $EMPBF_4$, $EMFPBF_4$, EMPTF, or DMFPTF.

10. The electrochemical cell of claim 1, wherein said electrolyte comprises a ternary molten salt mixture comprising a mixture of three single salts, at least one of which contains said pyrazolium cation.

11. The electrochemical cell of claim 10, wherein said ternary molten salt mixture comprises a second cation which differs from said pyrazolium cation, and a third cation which differs from said pyrazoline cation and said second cation.

12. The electrochemical cell of claim 11, wherein at least one of said second and third cations is in the form of a lithium salt selected from $LiBF_4$, $LiAsF_6$, $LiPF_6$, and LiTF.

13. The electrochemical cell of claim 11, wherein said pyrazolium cation, said second cation, and said third cation are in the form of a salt, and one of the anions of the three salts is different from the other two.

14. The electrochemical cell of claim 11, wherein said pyrazolium cation, said second cation, and said third cation are in the form of a salt, and the anions of the three salts are the same.

15. The electrochemical cell of claim 10, wherein said pyrazolium cation, said second cation, and said third cation are in die form of a salt, and at least one of the three salts comprises $DMPBF_4$, $DMFPBF_4$, $EMPBF_4$, $EMFPBF_4$, EMPTF, or DMFPTF.

16. The electrochemical cell of claim 13, wherein said pyrazolium cation, said second cation, and said third cation are in the form of a salt, and at least one of the three salts comprises $DMPBF_4$, $DMFPBF_4$, $EMPBF_4$, $EMFPBF_4$, EMPTF, or DMFPTF and another one of the three salts comprises $LiBF_4$, $LiPF_6$, $LiAsF_6$, or LiTF.

17. The electrochemical cell of claim 1, wherein said electrolyte further comprises at least one organic liquid.

18. The electrochemical cell of claim 17, wherein said organic liquid comprises propylene carbonate, diethyl carbonate, ethyl carbonate, ethyl methyl carbonate, acetonitrile, benzonitrile, dimethyl formamide, sulfolane, tetrahydrofuran, dioxane, dioxolane, methylformate, or combinations thereof.

19. The electrochemical cell of claim 1, wherein said pyrazolium cation is a pyrazolium salt which is distributed throughout a polymer matrix.

20. The electrochemical cell of claim 1, further comprising an anode and a cathode.

21. The electrochemical cell of claim 20, wherein said anode comprises a lithium metal, a lithiated carbon and/or a lithium intercalated electrode material.

22. The electrochemical cell of claim 20, wherein said cathode comprises $Li_xMn_2O_4$; $Li_xCoO_2$; $Li_xNiO_2$; modified $Li_xMn_2O_4$ electrodes; $Li_xMn_{2-x}Cu_xO_4$, wherein $0.1 < x < 0.5$; $LiM_{0.02}Mn_{1.98}O_4$ wherein M is selected from B, Cr, Fe, and Ti: a transition metal oxide; or an electrochemically active conductive polymer.

23. An electrochemical cell comprising an electrolyte, said electrolyte comprising a non-hydrophobic pyrazole or pyrazolium cation-containing molten salt, wherein said electrolyte exhibits an oxidation limit of greater than about 5V vs. lithium, and a thermal stability of up to at least about 300° C.

24. The electrochemical cell of claim 23, wherein said electrolyte comprises a single salt consisting essentially of pyrazolium cation and anions (X).

25. The electrochemical cell of claim 23, wherein said electrolyte comprises a binary molten salt mixture comprising a mixture of single salts, at least one of which contains a pyrazolium cation.

26. The electrochemical cell of claim 25, wherein said binary molten salt mixture comprises a second cation which differs from said pyrazolium cation.

27. The electrochemical cell of claim 26, wherein said second cation is in the form of a lithium salt selected from $LiBF_4$, $LiAsF_6$, and $LiPF_6$.

28. The electrochemical cell of claim 26, wherein said pyrazolium cation and said second cation are each in the form of a salt and the two salts are different.

29. The electrochemical cell of claim 25, wherein said molten salt mixture comprises two different salts, each containing the same pyrazolium cation.

30. The electrochemical cell of claim 26, wherein said pyrazolium cation and said second cation are both in the form of a salt and at least one of the two salts comprises $DMPBF_4$, $DMFPBF_4$, $EMPBF_4$, $EMFPBF_4$, EMPTF, or DMPTF.

31. The electrochemical cell of claim 26, wherein said pyrazolium cation and said second cation are both in the form of a salt and each of the salts comprises $DMPBF_4$, $DMFPBF_4$, $EMPBF_4$, $EMFPBF_4$, EMPTF, or DMPTF.

32. The electrochemical cell of claim 23, wherein said electrolyte comprises a ternary molten salt mixture comprising a mixture of three single salts, at least one of which contains said pyrazolium cation.

33. The electrochemical cell of claim 32, wherein said ternary molten salt mixture comprises a second cation which differs from said pyrazolium cation, and a third cation which differs from said pyrazolium cation and said second cation.

34. The electrochemical cell of claim 33, wherein at least one of said second and third cations is in the form of a lithium salt selected from $LiBF_4$, $LiAsF_6$, $LiPF_6$, and LiTF.

35. The electrochemical cell of claim 33, wherein said pyrazolium cation, said second pyrazolium cation, and said third cation are in the form of a salt, and one of the anions of the three salts is different from the other two.

36. The electrochemical cell of claim 33, wherein said pyrazolium cation, said second cation, and said third cation are in to form of a salt, an the anions of the three salts are the same.

37. The electrochemical cell of claim 33, wherein said pyrazolium cation, said second cation, and said third cation are in the form of a salt, and at least one of the three salts comprises $DMPBF_4$, $DMFPBF_4$, $EMPBF_4$, $EMFPBF_4$, EMPTF, or DMFPTF.

38. The electrochemical cell of claim 33, wherein said pyrazolium cation, said second cation, and said third cation are in the form of a salt, and at least one of the three salts comprises $DMPBF_4$, $DMFPBF_4$, $EMPBF_4$, $EMFPBF_4$, EMPTF, or DMFPTF and another one of the three salts comprises $LiBF_4$, $LiPF_6$, $LiAsF_6$, or LiTF.

39. The electrochemical cell of claim 23, wherein said pyrazolium cation is a pyrazolium salt which is distributed throughout a polymer matrix.

40. The electrochemical cell of claim 23, further comprising an anode and a cathode.

41. The electrochemical cell of claim 40, wherein said anode comprises a lithium metal, a lithiated carbon and/or a lithium intercalated electrode material.

42. The electrochemical cell of claim 40, wherein said cathode comprises $Li_xMn_2O_4$; $Li_xCoO_2$; $Li_xNiO_2$; modified $Li_xMn_2O_4$ electrodes; $Li_xMn_{2-x}Cu_xO_4$, wherein $0.1<x<0.5$; $LiM_{0.02}Mn_{1.98}O_4$ wherein M is selected from B, Cr, Fe, and Ti: a transition metal oxide; or an electrochemically active conductive polymer.

43. An electrochemical cell comprising an electrolyte, said electrolyte comprising a non-hydrophobic pyrazolium cation-containing molten salt, wherein said pyrazolium cation is in the form of a salt having the formula:

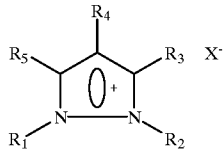

wherein $R_1$ and $R_2$ represent independently an alkyl group comprising 1–12 carbon atoms, and $R_3$, $R_4$, and $R_5$ represents independently H, F, $CF_3$, or an alkyl group comprising from 1 to about 5 carbon atoms, and $X^-$ represents a counter anion selected from a non-Lewis acid counter anion.

44. The electrochemical cell of claim 43, wherein said electrolyte comprises a binary molten salt mixture comprising a mixture of single salts, at least one of which contains a pyrazolium cation.

45. The electrochemical cell of claim 44, wherein said binary molten salt mixture comprises a second cation which differs from said pyrazolium cation.

46. The electrochemical cell of claim 45, wherein said second cation is in the form of a lithium salt selected from $LiBF_4$, $LiAsF_6$, and $LiPF_6$.

47. The electrochemical cell of claim 45, wherein said pyrazolium cation and said second cation are each in the form of a salt and the two salts are different.

48. The electrochemical cell of claim 44, wherein said molten salt mixture comprises two different salts, each containing the same pyrazolium cation.

49. The electrochemical cell of claim 45, wherein said pyrazolium cation and said second cation are both in the form of a salt and at least one of the two salts comprises $DMPBF_4$, $DMFPBF_4$, $EMPBF_4$, $EMFPBF_4$, EMPTF, or DMPTF.

50. The electrochemical cell of claim 43, wherein said electrolyte comprises a ternary molten salt mixture comprising a mixture of three single salts, at least one of which contains said pyrazolium cation.

51. The electrochemical cell of claim 50, wherein said ternary molten salt mixture comprises a second cation which differs from said pyrazolium cation, and a third cation which differs from said pyrazolium cation and said second cation.

52. The electrochemical cell of claim 51, wherein at least one of said second and third cations is in the form of a lithium salt selected from $LiBF_4$, $LiAsF_6$, $LiPF_6$, and LiTF.

53. The electrochemical cell of claim 51, wherein said pyrazolium cation, said second pyrazolium cation, and said third cation are in the form of a salt, and one of the anions of the three salts is different from the other two.

54. The electrochemical cell of claim 51, wherein said pyrazolium cation, said second cation, and said third cation are in the form of a salt, and at least one of the three salts comprises $DMPBF_4$, $DMFPBF_4$, $EMPBF_4$, $EMFPBF_4$, EMPTF, or DMFPTF and another one of the three salts comprises $LiBF_4$, $LiPF_6$, $LiAsF_6$, or LiTF.

55. The electrochemical cell of claim 43, wherein said counter anion is $BF_4^-$, $PF_6^-$, $AsF_6^-$, or $CF_3SO_3^-$, or a mixture thereof.

56. The electrochemical cell of claim 43, wherein said pyrazolium cation is a pyrazolium salt which is distributed throughout a polymer matrix.

57. The electrochemical cell of claim 43, further comprising an anode and a cathode.

58. The electrochemical cell of claim 57, wherein said anode comprises a lithium metal, a lithiated carbon and/or a lithium intercalated electrode material.

59. The electrochemical cell of claim 57, wherein said cathode comprises $Li_xMn_2O_4$; $Li_xCoO_2$; $Li_xNiO_2$; modified $Li_xMn_2O_4$ electrodes; $Li_xMn_{2-x}Cu_xO_4$, wherein $0.1<x<0.5$; $LiM_{0.02}Mn_{1.98}O_4$ wherein M is selected from B, Cr, Fe, and Ti: a transition metal oxide; or an electrochemically active conductive polymer.

* * * * *

UNITED STATES PATENT AND TRADEMARK OFFICE
CERTIFICATE OF CORRECTION

PATENT NO. : 6,326,104 B1
DATED : December 4, 2001
INVENTOR(S) : Caja et al.

It is certified that error appears in the above-identified patent and that said Letters Patent is hereby corrected as shown below:

Column 12,
Line 55, change "3" to -- 1 --.
Line 59, change "4" to -- 3 --.

Column 13,
Line 34, change "die" to -- the --.

Column 14,
Line 47, change "an" to -- and --.

Signed and Sealed this

Sixteenth Day of July, 2002

Attest:

Attesting Officer

JAMES E. ROGAN
*Director of the United States Patent and Trademark Office*